(12) United States Patent
Shukla

(10) Patent No.: US 11,706,706 B1
(45) Date of Patent: Jul. 18, 2023

(54) ACCESS POINT (AP) CLASSIFICATION AND SELECTION

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 17/476,240

(22) Filed: Sep. 15, 2021

(51) Int. Cl.
*H04W 48/20* (2009.01)
*H04W 48/14* (2009.01)
*H04W 28/08* (2023.01)
*H04W 84/18* (2009.01)

(52) U.S. Cl.
CPC ............ *H04W 48/20* (2013.01); *H04W 28/08* (2013.01); *H04W 48/14* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2006/0187873 A1* | 8/2006 | Friday | H04W 48/20 370/328 |
| 2022/0132373 A1* | 4/2022 | Hajduczenia | H04W 28/0812 |

* cited by examiner

*Primary Examiner* — Hong S Cho
(74) *Attorney, Agent, or Firm* — Lowenstein Sandler LLP

(57) ABSTRACT

Technologies directed to access point (AP) classification and selection to minimize a number of disconnect messages and achieve better throughput and reduce latency when a device is presented with multiple basic service set identifiers (BSSIDs) for AP selection are described. One method receives disconnect metrics from wireless devices, the disconnect metrics including a reason code associated with a disconnect message and a BSSID and an Organizationally Unique Identifier (OUI) associated with an AP. The method identifies a set of APs using a reason code for a load balancing or band steering operation by clustering the disconnect metrics. The method receives a query with a first BSSID and a first OUI associated with a first AP and determines that the first AP is part of the set of APs using the reason code. The method sends a response with the reason code being used for load balancing or band steering operation.

20 Claims, 11 Drawing Sheets

| Column 1 | Column 2 | Column 3 |
|---|---|---|
| operation | apCaps *302* | Example Vendor A AP (bold part with max entropy) |
| key | oui | |
| ht | hex string of HT capability element (52 char) 9.4.2.56.1 HT Capabilities element structure of IEEE 802.11-2016 | 2d 1a ad 09 03 ff ff ff ff 00 00 00 00 00 00 00 00 01 00 00 00 00 00 00 00 00 00 00 |
| vht | hex string of VHT capability element (24 char) 9.4.2.158.1 VHT Capabilities element structure of IEEE 802.11-2016 | bf 0c f2 79 8b 33 aa ff 00 00 aa ff 00 00 |
| eht | | null |
| extcap | string of Extended Capability element (20 character considering 10 octect) Table 9-135 - Extended Capabilities field of IEEE 802.11-2016 | 7f 08 01 00 0f 02 00 00 00 40 |

FIG. 3

| Country (402) | OUI 3b/BSSID (404) | Wi Fi Gen (406) | Score/Reasons (disconnect reason negative associated with Poor Performance) (408) | Last update timestamp 64b UTC (since Epoch) (410) | Digest (Helps identify unique model within same OUI, 32 Bytes) (412) |
|---|---|---|---|---|---|
| ES 00102040a | | 5 | -1 (the more negative the worst) | 7 July 2021 | 59 3a f7 68 37 e2 a7 6e ea b1 3a 51 4b 79 49 da bf e2 a4 e8 d1 7d 9a fe 82 8c 8b b1 ae ae 5f 8c |
| | | 5 | -5 | 10 March 2021 | e0 a9 a9 e8 b0 bb 37 54 d0 a3 b4 f1 54 b0 0c d8 77 f6 57 98 78 02 91 52 f2 23 4a d3 e7 af a9 5a |
| | | 5 | -2 | 10 Jan 2020 | d2 43 aa 58 da 0c 9e d3 61 59 32 4b 51 33 3b a0 8c f5 cd fb 17 a5 40 e0 ab 3d 89 11 bd 1b d7 8c |
| BR | a0b0c0d0e | 4 | 12 | | 29 73 f9 ba af 2e 5d 61 a1 0f 5b 9d 91 8b 2a f5 f3 a1 8b ae a7 8f bc c2 8d d5 89 48 77 51 08 20 |
| BR | a0b0c0d0e | 4 | -5 | | db 40 a0 36 53 72 46 88 14 f9 9b 37 50 5a 48 f9 23 b7 61 bf 11 eb 68 0e 86 84 26 14 7f f7 98 f1 |
| | | | | | |
| ... | ... | ... | ... | | |

FIG. 4

ACCESS POINT (AP) CLASSIFICATION AND SELECTION

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3 is a table of AP capabilities metrics that represent the AP capabilities of an AP, according to at least one embodiment.

FIG. 4 is a table of a database with scores and disconnect reason codes associated with APs, according to at least one embodiment.

DETAILED DESCRIPTION

Figure 1:
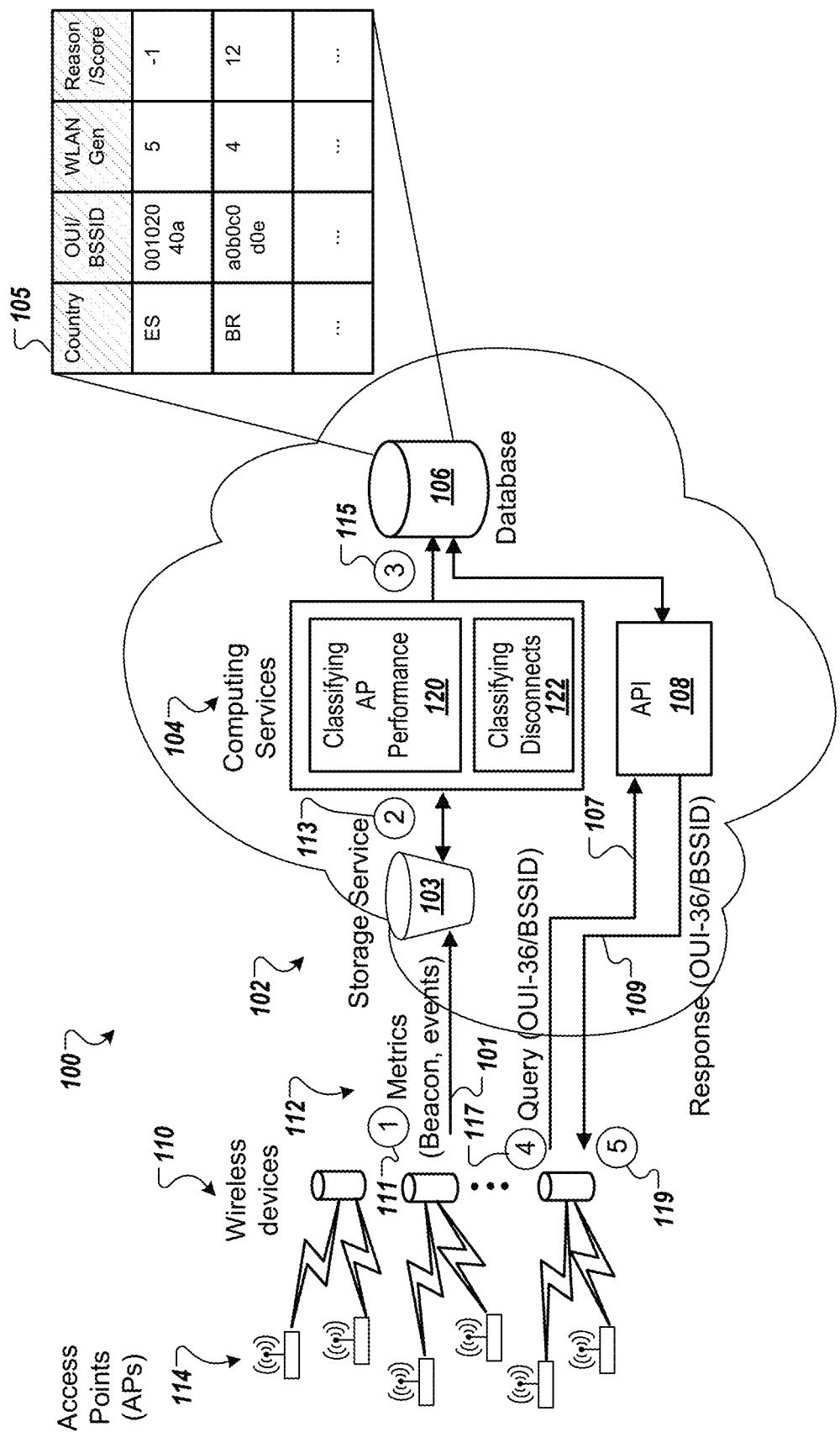
FIG. 1 is a network diagram of a cloud-based AP classification and query system according to at least one embodiment.

Technologies directed to access point (AP) classification and selection to minimize the number of disconnect messages and achieve better throughput and reduce latency when a device is presented with multiple basic service set identifiers (BSSIDs) for an AP selection process are described. The 2.4 GHz and 5 GHz industrial, scientific, and medical (ISM) radio bands allow unlicensed wireless communications. Due to its unlicensed nature, many short-ranged, low-power wireless communication systems operate in these frequency bands. As such, there is a limited de-license spectrum in various locations (e.g., 2.4 GHz ISM and 5 GHz U-NII bands). Various devices are described herein that include wireless local area network (WLAN) radios operate in the 2.4 GHz and 5 GHz U-NII-1 bands and utilize various WLAN protocols, such as the Wi-Fi® protocols (e.g., 802.11n, 802.11ac, or the like).

Routers with multiple radios may prefer to let a wireless device connect to a particular physical radio identified by a unique Basic Service Set Identifier (BSSID) (e.g., 48-bit MAC address with the first 24-36 bit unique to the router manufacturer). BSSID is an identifier for the basic service set and can be associated with a media access control (MAC) layer of 802.11 of an AP. That is, the BSSID can be the MAC address of the AP's radio for that service set. The selection of BSSID is completely under the wireless device's control, and therefore the wireless device may select a BSSID that the router may not like for various reasons. Upon successful connection to the device on a sub-optimal BSSID, the router can send a disconnect message (also referred to as "disconnect") with a specific reason code to get that device to use other preferred BSSIDs of the same router. This behavior is commonly seen with the enterprise networks, carrier networks, or Internet Service Provider (ISP) networks, where wireless devices can see multiple disconnect messages. When a disconnect message is sent, there is a specific reason code to indicate the router's desire. However, there are two problems: 1) the reason code is not always defined by the standard; and 2) the reason code reserved for band steering is sometimes also used by the routers for other reasons. One such example is a specific AP vendor, provided by ISP in countries like Spain and Brazil, which started disconnecting wireless devices in the 2.4 Ghz band every 8-9 minutes after a firmware upgrade. Therefore, today there is no reliable way to identify if a disconnect message is intended for a wireless device to switch to other BSSIDs for load balancing, band steering, or other quality of service (QoS) reasons in the context of an AP selection process.

Another problem is the wireless device may add a BSSID on an exclusion list upon receiving certain disconnects (based on reason codes). However, these disconnects may be transient in nature. So, in this case, the wireless device uses other suboptimal BSSIDs for the rest of the connection period as some wireless devices do not trigger roaming to correct for this. Also, some homes today have multiple vendor routers. For example, a user can use the same SSID password on multiple smartphone soft APs due to data caps. For the same Wi-Fi generation, the performance of these routers varies a lot. Therefore, there is no reliable way to identify disconnect messages that are transient in nature or identify suboptimal APs to prevent switches to suboptimal BSSIDs in the context of an AP selection process.

Aspects of the present disclosure address the above and other deficiencies by providing a solution that identifies APs that are doing load balancing, band steering, or other BSSID switching for QoS reasons in the context of an AP selection process. Aspects of the present disclosure address the above and other deficiencies by providing a solution that identifies sub-optimal APs in the context of an AP selection process. Aspects of the present disclosure address the above and other deficiencies by providing a reliable way for wireless devices to detect a disconnect intended for load balancing, band steering, or QoS reasons, avoiding using that BSSID for the purpose of AP BSSID selection. Aspects of the present disclosure address the above and other deficiencies by providing an ability to learn AP behavior in terms of transient disconnects, load balancing disconnects, band steering disconnects, or disconnects for other QoS reasons, and storing the results in a persistent database (e.g., in a cloud computing system). This allows the wireless devices to query the behavior whenever needed, instead of learning it on its own, which takes time to converge and causes performance to suffer during this time. Aspects of the present disclosure can avoid BSSIDs that are causing frequency disconnects in certain regions associated with a particular router vendor, load balancing behavior, or interoperability reasons.

One method receives disconnect metrics from wireless devices, the disconnect metrics including a reason code associated with a disconnect message and a BSSID and an Organizationally Unique Identifier (OUI) associated with an AP. The method identifies a set of APs using a first reason code for a load balancing or band steering operation by clustering the disconnect metrics. The method receives a query with a first BSSID and a first OUI associated with a first AP and determines that the first AP is part of the set of APs using the first reason code. The method sends a response with the first reason code being used for load balancing or band steering operation FIG. 1 is a network diagram of a cloud-based AP classification and query system 100 according to at least one embodiment. The cloud-based AP classification and query system 100 is implemented on one or more computing devices and one or more memory devices of a cloud computing system. The cloud computing system can include one or more cloud servers, one or more data storage devices, as well as other resources. The cloud server provides a cloud service (e.g., server device) that can securely store metrics collected from multiple wireless devices 110 regarding the multiple APs 114 and classify the multiple APs 114 using the metrics for helping the wireless devices 110 in connection with an AP selection process when presented with multiple BSSIDs of multiple APs 114. Each wireless device 110 includes at least one WLAN radio (e.g., Wi-Fi® radio) that operates at 2.4 GHz, 5 GHz, or both. The wireless device 110 can be any electronic device to wirelessly connect to one or more APs 114, such as a station, a client device, a network device, or the like. The wireless device 110 can also be a client with respect to the APs 114, but it can also be a device that provides an AP as well. Additional details of the wireless devices 110 are described below with respect to FIG. 2B.

As illustrated in FIG. 1, the cloud-based AP classification and query system 100 can include a storage service 102, computing services 104, a database 106, and an application programming interface (API) 108 for querying the database 106. Multiple wireless devices 110 can be connected with the cloud-based AP classification and query system 100 over one or more networks 112. The network(s) 112 can include one or more public or private networks, such as the Internet. The multiple wireless devices 110 can connect to one or more APs 114. As described above, the wireless devices 110 are responsible for AP selection when presented with multiple BSSIDs of different APs 114. The wireless devices 110 can utilize the cloud-based AP classification and query system 100 in connection with the AP selection process, as described herein. The APs 114 can be provided by a wireless device or a wired device. These devices can be hard wired or otherwise connected to a cable modem that provides Internet access. A single device can provide multiple APs 114, where each of the APs 114 is associated with a BSSID and an Organizationally Unique Identifier (OUI).

In one example flow of events, the wireless devices 110 send metrics 101 (also referred to as AP capability metrics) to the cloud-based AP classification and query system 100 as a first event(s) 111. The cloud-based AP classification and query system 100 can store the metrics 101 as historical data 103 using a storage service 102. Alternatively, the metrics 101 can be stored in any type of data repository to be accessed by the computing services 104. In at least one embodiment, the metrics 101 can include capability information for one or more of the APs 114. In at least one embodiment, the metrics 101 can include event data, such as data associated with disconnect events. The event data can include the reason codes specified in the disconnect messages received from the particular AP 114. In at least one embodiment, the wireless devices 110 can receive one or more beacon frames from one or more APs 114. The wireless device 110 can send the data from the beacon frames or a portion of the beacon frames. An AP beacon frame, which is broadcast periodically, contains the AP's WLAN capabilities. The wireless device 110 can extract the elements that often do not change during run-time (i.e., from one beacon to the next beacon) and send the extracted elements in the metrics 101. Additional details of the metrics 101 are described below with respect to FIG. 3.

As a second event(s) 113, the computing services 104 can retrieve the historical data 103 and perform classification on the historical data 103 using one or more machine learning (ML) models. In at least one embodiment, the computing services 104 include classifying AP performance logic 120 that classifying a score for each of the APs 114 using an ML model and the metrics 101. In at least one embodiment, the computing services 104 include classifying disconnects logic 122 that classifying the reason codes used by the APs 114 for load balancing, band steering, or other BSSID switching for QoS purposes. Additional details of the classifying AP performance logic 120 and classifying disconnects logic 122 are described below with respect to FIG. 2A.

As a third event(s) 115, the computing services 104 generate data 105 to be stored in one or more tables of a database 106. The database 106 includes multiple entries, each entry including i) a location identifier of the respective AP (e.g., ES for Spain, BR for Brazil), ii) a combined value of the OUI and the BSSID of the respective AP, iii) a WLAN generation identifier, and iv) at least one of the score or the reason code associated with the respective AP. Alternatively, the entries can include additional information as described herein.

As a fourth event(s) 117 after at least a portion of the database 106 is created, a wireless device 110 can send a query 107 to the cloud-based AP classification and query system 100. The query 107 can include a value for a given AP, the value including a combination of the OUI and BSSID. The query 107 can be done in connection with a disconnect event (i.e., a disconnect message with a reason code being received by the wireless device 110 from the AP 114) or in connection with an AP selection process to eliminate or prioritize APs based on a score. The query 107 can be made via an API 108. The API 108 can be a REST API. The API 108 retrieves relevant data from the database 106 and sends a response 109 to the wireless device 110 as a fifth event(s) 119. The response 109 can include the OUI/BSSID value and a reason code in the case of a disconnect event or a score in the case of identifying suboptimal APs for an AP selection process.

As illustrated in the overall flow of events 111-119, wireless devices 110 can report metrics 101 into a central database that maintains AP performance scores and/or reason codes used for load balancing/band steering, etc., across regions (e.g., database 106). Any one of the wireless devices 110 can also query the central database with the AP BSSID to see if there exists an associated score or reason code that the wireless device can use for an AP selection process. If there is no entry in the database 106, existing AP selection rules can be used. When an entry is found, the associated score or reason code can be used to rank the APs 114 for the purpose of the AP selection process.

In other embodiments, the functionality of the cloud-based AP classification and query system 100 can be implemented on a controller device that is not necessarily part of a cloud computing system.

Figure 2A:
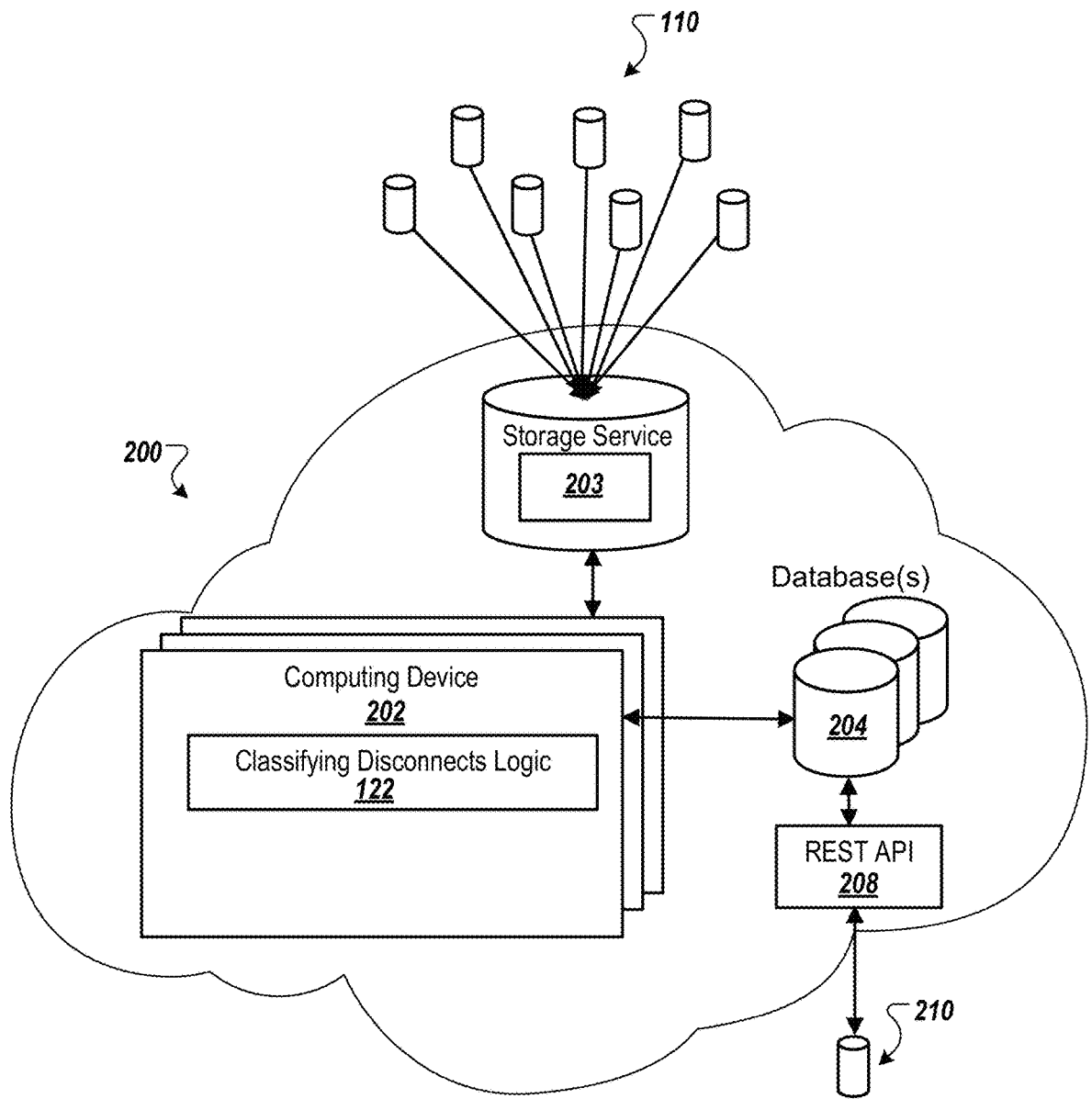
FIG. 2A is a block diagram of a cloud computing system with one or more computing devices for classifying disconnects logic according to at least one embodiment.

FIG. 2A is a block diagram of a cloud computing system 200 with one or more computing devices for classifying disconnects logic 122 according to at least one embodiment. The cloud computing system 200 is similar to the cloud computing system 100 of FIG. 1 as noted by similar reference numbers. The cloud computing system 200 includes one or more computing devices 202 (e.g., processing devices) and one or more memory devices 204. The one or more memory devices 204 can store instructions of the classifying disconnects logic 122 that classifies historical data to identify APs that are doing load balancing and band steering and the reason codes being used by those APs to reduce the number of disconnects received by the wireless devices 110. The one or more memory devices 204 can also store a database that can be queried by the wireless devices 110 via a REST API 208, as described below. The database can include multiple entries. Each entry can include i) a location identifier of the respective AP, ii) a combined value of the OUI and the BSSID of the respective AP, iii) a generation identifier, and iv) a reason code associated with the respective AP, the reason code being used by the respective AP for load balancing, band steering, or the like.

During operation, the cloud computing system 200 receives disconnect metrics 203 from one or more of the wireless devices 110 and stores the disconnect metrics 203 for processing by the classifying disconnects logic 122. The disconnect metrics 203 (also referred to herein as event data) can be received in connection with disconnect events. A disconnect event occurs when a wireless device receives a disconnect message with a reason code. Each disconnect metric 203 can include at least i) a reason code associated with a disconnect message received by a respective one of the wireless device 110 from an AP, and ii) a BSSID and an OUI associated with the AP. The classifying disconnects logic 122, executed on one or more computing devices 202, identifies a set of APs that are using a first reason code for a load balancing or band steering operation by clustering the disconnect metrics 203. In at least one embodiment, the classifying disconnects logic 122 can identify AP vendor anomalous behavior by analyzing the disconnect metrics 203 coming from the wireless device 110, such as millions of devices. By clustering the disconnect metrics 203 along with the APs' OUIs in the cloud computing system 200, AP vendors that are using a particular disconnect reason code for load balancing purposes (or other purposes) can be identified. Once the reason codes associated with AP vendors are learned by the classifying disconnects logic 122, the reason codes can be stored in connection with the AP's OUI. This information can be shared with the wireless devices 110. For example, a list of OUI and associated reason codes used for load balancing can be sent to the wireless devices 110 to be used in connection with an AP selection process by the wireless devices 110. The set of reason codes together with the OUI can be added to the device's ordered lists (last element with least priority) used for load balancing based on reason codes. The ordered lists can be used to prioritize the APs in the desired order during the AP selection process.

In at least one embodiment, the cloud computing system 200 receives a query from a first wireless device 210. The query can include a first BSSID and a first OUI associated with a first AP. The cloud computing system 200 can determine that the first AP is part of the set of APs that uses the first reason code for the load balancing or band steering operation using the database. The cloud computing system 200 can send a response to the first wireless device 210. The response can include the first reason code used for the load balancing or band steering operation. The first wireless device 210 can use the first reason code to assign a priority to the first AP for an AP selection process.

In another embodiment, a default list of disconnect reason codes can be maintained for band steering and load balancing (e.g., reason code 12) at the first wireless device 210. This list can be modified when an AP (ISP router) is upgraded and starts to use other reason codes for load balancing. Instead of triggering a software upgrade on the first wireless device 210, the first wireless device 210 can query the database periodically, or on request, to obtain a reason code associated with the OUI/BSSID of the AP. Once the AP is upgraded and starts to use the updated reason code, the disconnect metrics 203 start to reflect the updated reason code. In another embodiment, a sudden change in disconnect reasons associated with a particular router vendor can be detected in the disconnect metrics 203. The cloud computing system 200 can determine whether the sudden changes are transient or permanent in nature and update the database accordingly.

In at least one embodiment, the first wireless device 210, upon receiving a disconnect message from an AP, checks if the reason code in the disconnect message is present in a local list or can query the database of the cloud computing system 200. If the reason code is found, the first wireless device 210 can place the AP on an exclusion list or de-prioritize the AP (e.g., only be used as backup when all other APs fail). If the reason code is not found, the first wireless device 210 can perform the AP selection according to default selection rules. In either case, the first wireless device 210 sends the disconnect metric with OUI (e.g., OUI-36) and the reason code to the cloud computing system 200 for the purpose of clustering to assess if this is widespread in the region, or limited to just a few devices. This can allow wireless devices to learn new reason codes used for the purpose of load balancing, band steering, AP interoperability, or the like, causing frequent disconnects without a need for a software update on the wireless devices.

Figure 2B:
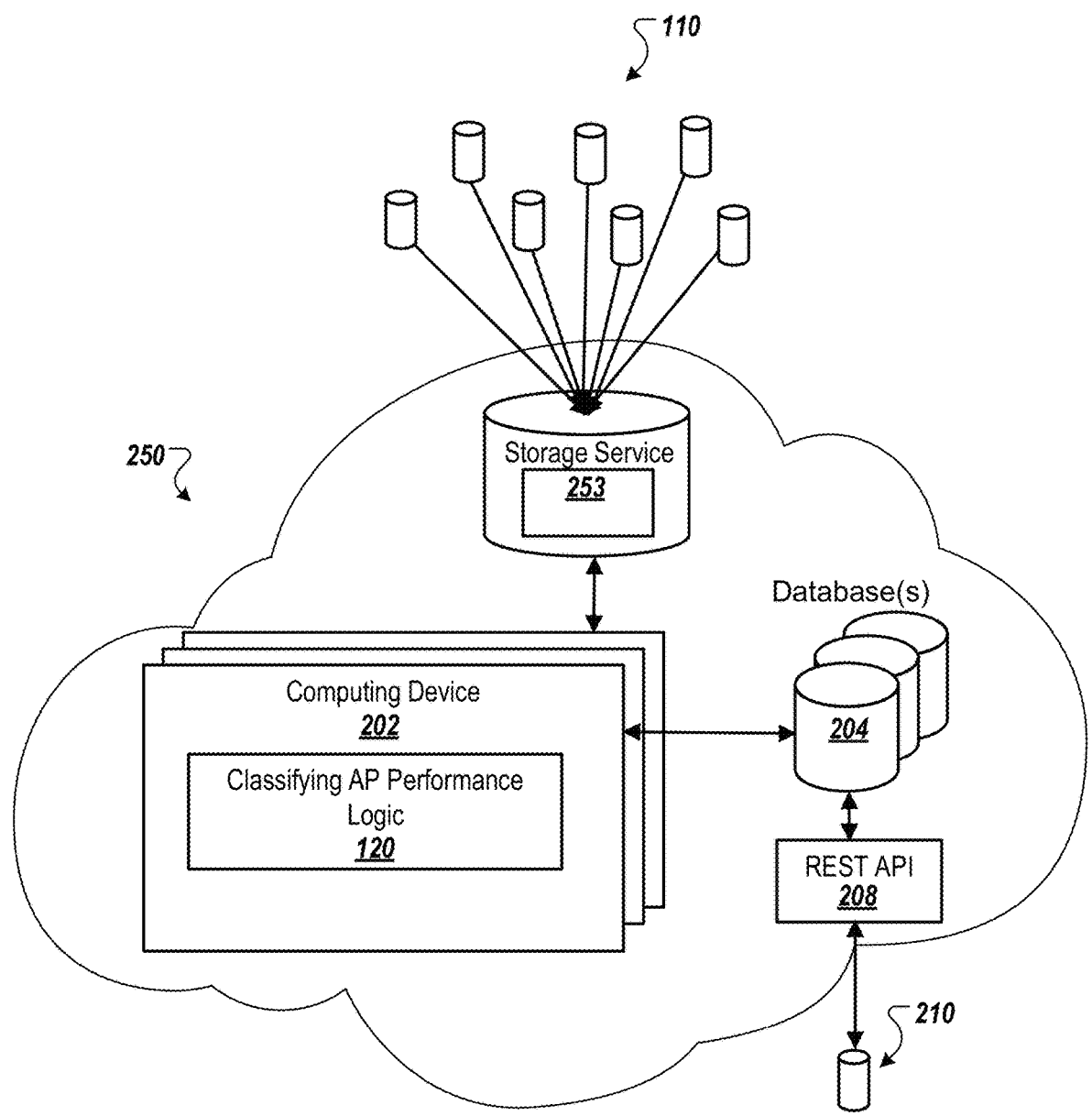
FIG. 2B is a block diagram of a cloud computing system with one or more computing devices for classifying AP performance logic according to at least one embodiment.

FIG. 2B is a block diagram of a cloud computing system 250 with one or more computing devices for classifying AP performance logic according to at least one embodiment. The cloud computing system 250 is similar to the cloud computing system 200 of FIG. 2A as noted by similar reference numbers. The cloud computing system 250 includes one or more computing devices 202 (e.g., processing devices) and one or more memory devices 204. The one or more memory devices 204 of the cloud computing system 250 can store instructions of the classifying AP performance logic 120 that classifies historical data to identify suboptimal APs to achieve better throughput and reduce latency when a wireless device is presented with multiple BSSIDs for AP selection. The one or more memory devices 204 can also store a database that can be queried by the wireless devices 110 via a REST API 208, as described below. The database can include multiple entries. Each entry can include i) a location identifier of the respective AP, ii) a combined value of the OUI and the BSSID of the respective AP, iii) a generation identifier, and iv) a score representing a performance level of the respective AP.

During operation, the cloud computing system 200 capability metrics 253 from one or more of the wireless devices 110 and stores the capability metrics 253 for processing by the classifying AP performance logic 120. The capability metrics 253 (also referred to herein as capability information or vendor information) can be received in connection with disconnect events. Alternatively, the capability metrics 253 can be collected in other contexts than disconnect events. For some context, there are varieties of different Wi-Fi AP models built with different Wi-Fi vendor chipsets and running different Wi-Fi configurations. Only a few Wi-Fi SoC vendors supply core Wi-Fi hardware software to these Wi-Fi AP vendors. Based on the capability metrics 253 from the wireless device 110, it can be determined that not all AP vendors perform at the same level. Within the same AP vendor category, differences in performance levels between specific models can also be seen. In particular, the capability metrics 253 can show that even some of the most recent 802.11 ac APs do not perform that well compared with other vendors. The classifying AP performance logic 120 can identify APs that are having interoperability or performance issues in the field using the capability metrics 253. The classifying AP performance logic 120 can maintain a fingerprint or signature of each of the APs with bad performance. The wireless devices 110 can use the signature of these APs to reduce the number of connections to these APs when possible.

In at least one embodiment, the classifying AP performance logic 120 can generate a fingerprint of router models and underlying performance without asking end customers to report the router make and model number. There are multiple reasons for not requesting make and model numbers from customers, including: 1) it is not easy to get the model (language, customer awareness, router physical location, worn/lack of sticker, no graphical user interface (GUI) access); 2) sometimes same AP model makes use of the different Wi-Fi chipsets; 3) It is not scalable and adds more burden on both end-users and customer agents, and 4) a firmware upgrade on the router may change the performance, therefore the database needs to be updated dynamically. Additional details of fingerprinting are described below with respect to FIG. 3.

Figure 2C:
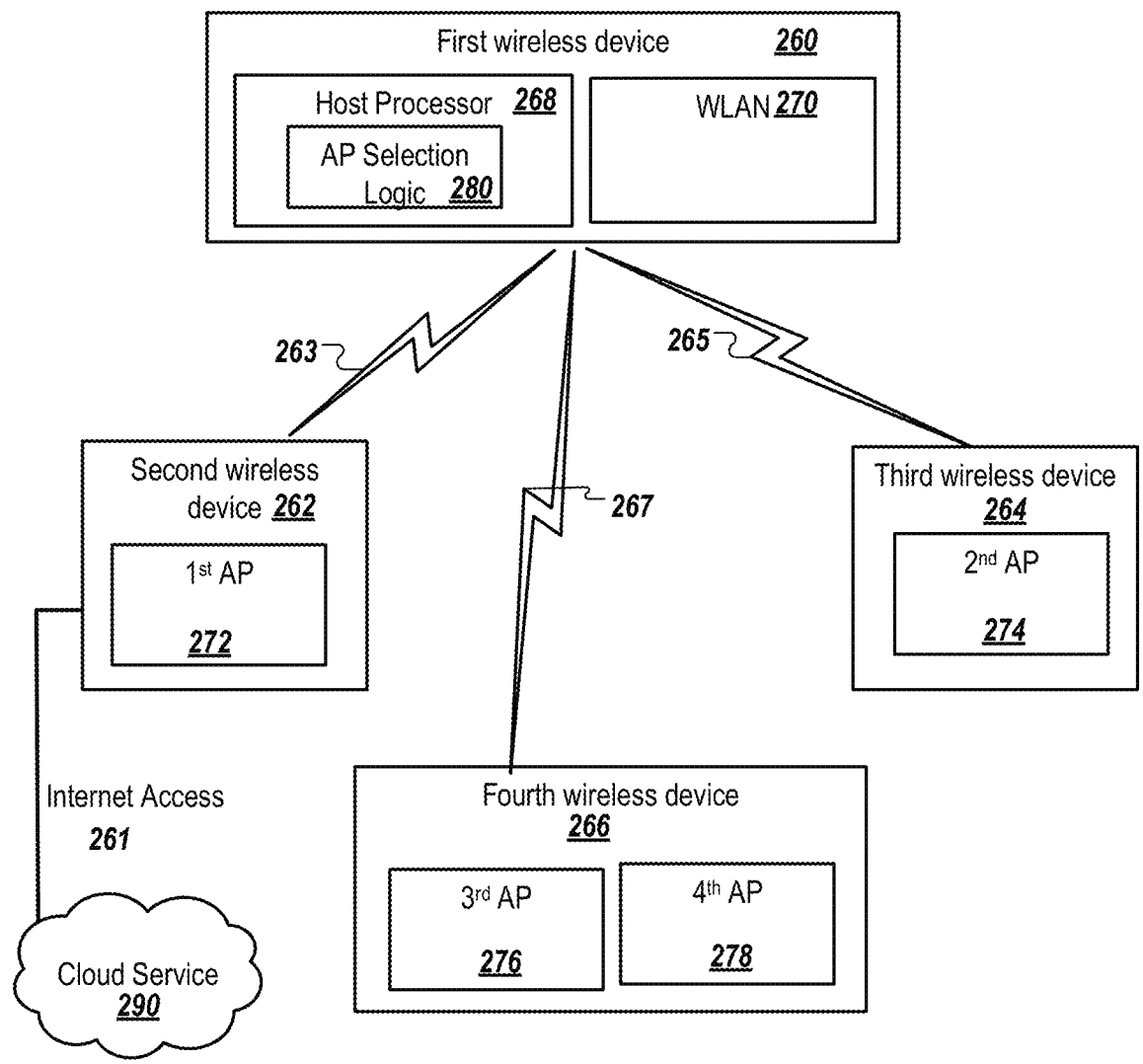
FIG. 2C is a network diagram of a wireless device in proximity to multiple APs according to at least one embodiment.

FIG. 2C is a network diagram of a first wireless device 260 in proximity to multiple APs according to at least one embodiment. The first wireless device 260 can be a client device, endpoint device, or station that is presented with multiple APs 272-278 provided by other wireless devices 262-266. Second wireless device 262 can provide backhaul connectivity to a first wireless network, such as using a wired or wireless connection 261 to the Internet. For example, the second wireless device 262 can be connected to a gateway or a modem via wired or wireless connection 261. Alternatively, the second wireless device 262 can be a router or a gateway and can provide internet access to the first wireless device 260. Similarly, the third wireless device 264 and the fourth wireless device 266 can provide Internet access and access to a second wireless network and a third wireless network. Alternatively, the second, third, and fourth wireless devices can provide access to the same network. In at least one embodiment, the second wireless device 262 fetches media data, such as audio or video data, from the Internet and distributes the media data over the air to the first wireless device 260.

In at least one embodiment, the first wireless device 260 includes a host processor 268 and a WLAN radio 270. The host processor 268 can include circuitry that implements the AP selection logic 280 that can receive data from a cloud computing system to reduce the number of disconnect events and avoid selecting suboptimal APs, as described herein.

The wireless device 260 can include various components, such as one or more processors (e.g., a host processor or central processing unit (CPU), one or more graphics processors, input-output (I/O) devices, memory devices, storage devices, or the like. The wireless device 260 can be an Internet of Things (IoT) device, a portable computing device, or other user devices. The wireless device 260 can be a content rendering device that includes a modem for connecting the user device to a network, electronic book readers, portable digital assistants, mobile phones, laptop computers, portable media players, tablet computers, cameras, video cameras, netbooks, notebooks, desktop computers gaming consoles, Blu-ray® or DVD players, media centers, drones, audio-input -enabled devices, speech-based personal data assistants, voice control and speaker devices, smart switches, smart bulbs, remotes, televisions, television set-top boxes, television dongles, or the like. The wireless device 260 may also be an audio-input-enabled device, such as the Amazon Echo device, developed by Amazon Technologies, Inc. of Seattle, Wash. Alternatively, the wireless device 260 may be a set-top box (STB) or other media-streaming device. The electronic device may connect to a network to obtain content from a server computing system (e.g., an item-providing system) or perform other activities. The wireless device 260 can connect to one or more different types of cellular networks, personal area networks (PANs), in addition to the WLAN (e.g., Wi-Fi® networks). In some embodiments, the first wireless device 260 connects to an AP, which provides access to the Internet, a private network, or other public networks.

The wireless device 260 includes a circuit board, such as a printed circuit board (PCB) upon which one or more of the components described above is disposed. The components can be integrated into one or more integrated circuits. In some embodiments, the components can separate integrated circuits or chipsets. In one embodiment, the first wireless device 260 includes a host processor 268 and a WLAN radio 270. The host processor 268 can execute AP selection logic 280. The AP selection logic 280 can report the metrics to the cloud computing system and as query the database of the cloud computing system for the AP selection process, as described herein. In other embodiments, the components can reside on a common carrier substrate die of an integrated circuit. For example, the first wireless device 260 can include a processing element, one or more radios, including a baseband processor, and RF front-end circuitry. The baseband processor is operable to generate RF signals to radiate electromagnetic energy via one or more antennas. In some cases, the baseband processor and other circuitry can be implemented in an RF module, such as a chipset implementing the Wi-Fi® technology. In addition to the baseband processor, the first wireless device 260 can also include an application processor (AP) that implements other operations of the first wireless device 260. In another embodiment, an application-specific integrated circuit (ASIC), a field-programmable gate array (FPGA), or other mixed-signal integrated circuits may be used to implement the operations described herein. In one embodiment, the baseband processor includes one or more transceivers that can operate at 2.45 GHz and 5 GHz. The baseband processor can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology, including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmission and receiving data using reciprocity.

In at least one embodiment, the first wireless device 260 includes one or more additional radios, such as a PAN radio (e.g., BLE or Bluetooth® classic technology), a cellular radio, or the like. In at least one embodiment, a second radio can be used to communicate information between the first wireless device 260 and the other wireless devices 262-266.

The host processor 268 can establish a first wireless connection 263 with the second wireless device 262 using the WLAN radio 270, a second wireless connection 265 with the third wireless device 264 using the WLAN radio 270, and a third wireless connection 267 with the fourth wireless device 266 using the WLAN radio 270. More specifically, the first wireless device 260 can be presented with multiple BSSIDs corresponding to the first AP 272, the second AP 274, the third AP 276, and the fourth AP 278. The AP selection logic 280 can select which of the APs 272-278 using a set of AP selection rules. As described herein, the first wireless device 260 can use data from a cloud computing system to prioritize the APs 272-278 based on disconnect events and AP performance scores, as described herein.

In at least one embodiment, the first wireless device 260 receives, from a cloud service 290 (a server device), data that associates a first reason code with a first BSSID and a first OUI associated with the first AP 272. The first reason code is associated with a load balancing or band steering operation of the first AP 272. The first wireless device 260 establishes the first connection 263 with the first AP 272. At some point, the first wireless device 260 receives a disconnect message from the first AP 272. The disconnect message includes a first reason code (e.g., reason code 12). The first wireless device 260 prioritizes, using the data, a second AP over the first AP. The first wireless device 260, using the AP selection logic 280, selects the second AP 274 and establishes the second connection 265 with the second AP 274. In some cases, the vendor can use the same OUI number for different models. In this case, the cloud service 290 can associate the first OUI and first BSSID with the first reason code and the first OUI and second BSSID with a second reason code.

In at least one embodiment, the first wireless device 260 identifies the first BSSID and first OUI associated with the first AP 272, a second BSSID and second OUI associated with the second AP 274, a third BSSID and third OUI associated with the third AP 276, and a fourth BSSID and fourth OUI associated with the fourth AP 278.

In a further embodiment, the first wireless device 260 sends disconnect data back to the cloud service 290, the disconnect data including the metrics described herein. For example, the first wireless device 260 sends event data, including the first OUI, the first BSSID, and the first reason code. In another embodiment, the first wireless device 260 receives one or more beacon frames from the third AP 276. The first wireless device 260 sends, to the cloud service 290, capability information of the third AP 276. The capability information identifies at least a throughput capability of the third AP 276. Similarly, the first wireless device 260 can receive beacon frames from the other APs 272, 274, 278, and report the corresponding capability information to the cloud service 290. In at least one embodiment, the capability information includes: i) a portion of a first hex string of capability elements in a High Throughput (HT) capabilities element structure of the one or more beacon frames, ii) a portion of a second hex string of capability elements in a Very High Throughput (VHT) capabilities element structure of the one or more beacon frames, iii) a portion of a third hex string of capability elements in an Extremely High Throughput (EHT) capabilities element structure of the one or more beacon frames, or iv) a portion of a fourth hex string of capabilities elements in an Extended Capabilities (EXT_CAP) capabilities element structure of the one or more beacon frames. The capability information can be stored in an AP capabilities metric, such as illustrated in FIG. 3.

FIG. 3 is a table 300 of AP capabilities metrics that represent AP capabilities of an AP, according to at least one embodiment. The table 300 includes a metric 302, called apCaps, which is defined to capture AP capabilities. The metric 302 can include values for an OUI 304, a first hex string of HT capability element 306, a second string of VHT capability element 308, a third string of EHT capability element 310, and/or a fourth string of EXT_CAP capability element 312. The table 300 includes example values for an example Vendor A's AP. Some of the values are bolded, which represents the part of the number with the max entropy after classification. These are the values that indicate the AP vendor and the AP's capabilities for clustering APs for disconnects and suboptimal AP performance classifications.

Referring back to FIG. 2C, in another embodiment, the first wireless device 260 receives one or more beacon frames from the third AP 276. The first wireless device 260 can extract vendor information about the third AP 276 from the one or more beacons. In at least one embodiment, the vendor information identifies a vendor model of the third AP 276 or information that can be classified into a signature of a vendor model of the third AP 276. Information from the Beacon elements Extended Capability, HT Capabilities, VHT Capabilities, EHT Capabilities together with vendor elements can be characterized into a signature for a digest that can be used to identify similar devices even when the AP model information is not provided. The signature of the AP vendor information can be considered an anonymized model number. In at least one embodiment, the vendor information includes a portion of a hex string of vendor elements in the one or more beacon frames.

In another embodiment, the first wireless device 260 can send a query to the cloud service 290. The query can include a second BSSID and a second OUI associated with the second AP 274. The first wireless device 260 receives a response from the cloud service 290. The response includes a score associated with the second AP 274. The score represents a performance level of the second AP 274. The first wireless device 260 can receive scores of the first AP 272, the third AP 276, and the fourth AP 278. The first wireless device 260 can determine that the score for the second AP 274 is below a specified threshold or is lower than a score for the third AP 276. The first wireless device 260 can establish the third connection 267 with the third AP 276 based on the score of the second AP 274 being lower than a score of the third AP 276.

In one embodiment, the cloud service 290 associates the first OUI and the first BSSID of the first AP 272 with the first reason code and a first score that represents a performance level of the first AP 272. The cloud service 290 associates a second OUI and a second BSSID of the second AP 274 with a second score that represents a performance level of the second AP 274. The cloud service 290 associates a third OUI and a third BSSID of the third AP 276 with a third score that represents a performance level of the third AP 276. The first wireless device 260 can determine that the second score is greater than the third score before establishing the second wireless connection 265 with the second AP 274.

In at least one embodiment, the cloud service 290 can generate fingerprints of the APs. AP beacon frames, which are broadcast periodically, contain AP's Wi-Fi capabilities. The first wireless device 260 can extract elements from the beacon frame. The extract elements are those that do not change from one beacon frame to the next beacon frame. For example, the following set of elements can be extracted: HT Capability (defined 11n capability of the associated radio); VHT Capability (11ac+); EHT Capability (11ax+); and Extended Capability (router protocol support especially WFA cert). In a further embodiment, the vendor elements, including the WPS element, can be extracted. The WPS element may sometimes carry the vendor AP model. Some beacon frames of some APs have more than one vendor element, which can increase the size of the payload. The first wireless device 260 can extract portions of the vendor elements in that case. In one example from a Vendor A's AP could be: Vendor Element 1—"dd 1a 00 90 4c 04 08 bf 0c f2 79 8b 33 aa ff 00 00 aa ff 00 00 c0 05 00 00 00 fc ff", Vendor Element 2—"dd 09 00 03 7f 01 01 00 00 ff 7f", WPS—"dd 1d 00 50 f2 04 10 4a 00 01 10 10 44 00 01 02 10 57 00 01 01 10 49 00 06 00 37 2a 00 01 20". The first wireless device 260 can extract portions of the elements and send portions of the elements to the cloud service 290.

As described herein, the values of these elements and connectivity events, such as disconnect events (e.g., frequent disconnects or beacon misses) and DHCP lease failures, are used as ML input feature set of an ML model. Each wireless device uploads this data as hex string metrics to the cloud service 290. In at least one embodiment, the cloud service 290 uses an ML Random Forest Classifier model, which is trained with labeled data (known poor APs), to generate high-level router performance signature mapping. The labeled data set for training this model can be obtained using the newly added 'apCaps' metrics and performance data characterized based on the Wi-Fi disconnect events (or other connectivity events). In a further embodiment, customer contact data can be used in connection with the 'apCap' metric to generate labeled data. Once the model is trained, the model starts classifying potential APs associated with devices that may suffer from poor Wi-Fi performance. The Random Forest Classifier model allows classification based on the "apCap" metric together with the Wi-Fi disconnect metric. In at least one embodiment, a device metric ingestion pipeline in the cloud service 290 can use the trained data set and can classify the AP performance (e.g., Good, OK, BAD) associated with a particular device. The cloud service 290 can score the AP at this point based on the other device metrics and information about the AP make and models.

In at least one embodiment, the cloud service 290 receives, from multiple wireless devices, capability information of each of the APs 272-278. The capability information identifies at least a throughput capability of the respective AP that is broadcast in one or more beacon frames by the respective AP. The cloud service 290 generates a score for each of the APs 272-278 using a machine learning (ML) model. The score represents a performance level of the respective AP. An input feature set of the ML model includes at least the capability information and the disconnect metrics (or other connectivity metrics). The cloud service 290 associates the score with a BSSID and an OUI of the respective AP. The cloud service 290 receives a query from the first wireless device 260. The query includes a BSSID and OUI associated with the second AP 274. The cloud service 290 sends a response to the query to the first wireless device 260. The response includes the score associated with the second AP 274. In at least one embodiment, the capability information previously reported to the cloud service 290 includes at least i) a portion of a first hex string of capability elements in an HT capabilities element structure of the one or more beacon frames, ii) a portion of a second hex string of capability elements in a VHT capabilities element structure of the one or more beacon frames, iii) a portion of a third hex string of capability elements in an EHT capabilities element structure of the one or more beacon frames, or iv) a portion of a fourth hex string of capabilities elements in an EXT_CAP capabilities element structure of the one or more beacon frames.

In at least one embodiment, the cloud service 290 receives, from multiple wireless devices, vendor information of each of the APs 272-278. The cloud service 290 generates a signature for each of the APs using the vendor information and portion of Extended Capability, HT Capabilities, VHT Capabilities, and EHT Capabilities. In other cases, the vendor information identifies a vendor model of the respective AP that is broadcast in one or more beacon frames by the respective AP. The cloud service 290, by a ML model and using the signature and the data, generates a score for each of the APs 272-278. The score represents a performance level of the respective AP. In at least one embodiment, an input feature set comprises at least the vendor information and the disconnect metrics (or other connectivity metrics). In at least one embodiment, the cloud service 290 associates the score with a BSSID and an OUI of the respective AP. The cloud service 290 receives a query from the first wireless device 260. The query includes a BSSID and OUI associated with the second AP 274. The cloud service 290 sends a response to the query to the first wireless device 260. The response includes the score associated with the second AP 274. In at least one embodiment, the vendor information previously reported to the cloud service 290 includes a hex string of vendor elements. In another embodiment, the vendor information can be characterized from information in other capability elements.

FIG. 4 is a table 400 of a database with scores and disconnect reason codes associated with APs, according to at least one embodiment. The table 400 includes a first column 402 with a country code, a second column 404 with an OUI-36/BSSID value, a third column 406 with a Wi-Fi Generation number, a fourth column 410 with a last update timestamp, and a fifth column 412 with a digest. The digest can include a signature or a fingerprint representing unique, anonymized model numbers when AP vendor uses the same OUI for different Wi-Fi router models. A lookup in the table 400 returns the data in the columns to let a wireless device know which associated score is based on the received capability information, extracted from beacon frames of the respective AP. In this example, the lower the negative number, the worse the AP performance is. In at least one embodiment, an algorithm (e.g., SHA256) can be used to generate a digest that takes input from ApCap, Beacon elements, or the like. Therefore, upon a change in the static beacon field content, which typically happens after a software upgrade on the AP, causes a change in the digest. The same algorithm to make the digest can be used by the wireless device when querying the database to match.

In at least one embodiment, for a given OUI and Wi-Fi gen, multiple entries are maintained if they have different digests. This along with the updated timestamp helps track the AP firmware upgrade and associated performance.

As illustrated in FIG. 4, the table 400 can also store disconnect reason codes (e.g., reason code 12) associated with the OUI-36/BSSID. A query for the disconnect reason code would return the reason code associated with the respective AP associated with the queried OUI-36/BSSID.

Figure 5A:
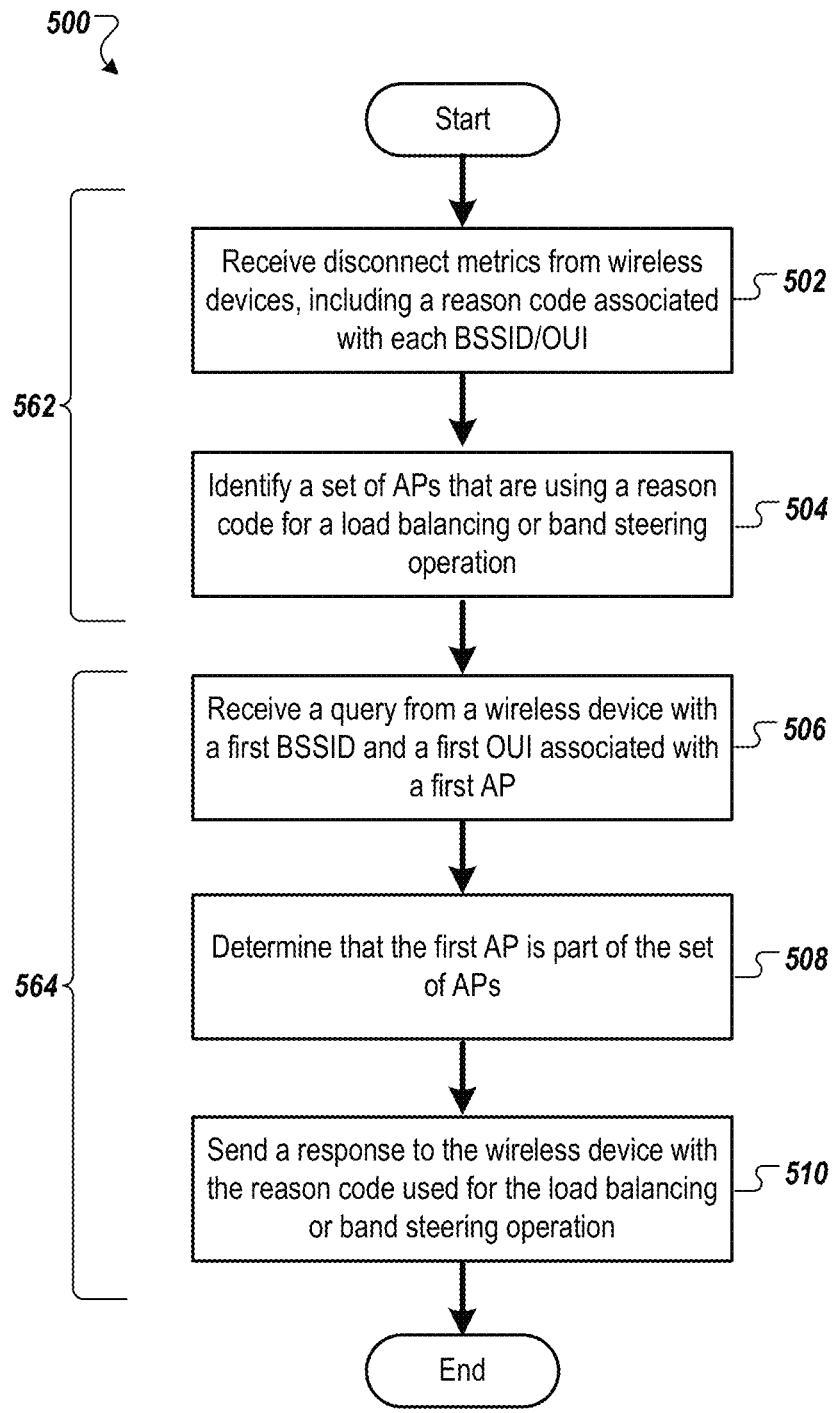
FIG. 5A is a flow diagram of a method of classifying a reason code used for a load balancing or band steering operation, according to at least one embodiment.

FIG. 5A is a flow diagram of a method 500 of classifying a reason code used for a load balancing or band steering operation, according to at least one embodiment. The method 500 may be performed by processing logic that comprises hardware (e.g., circuitry, dedicated logic, programmable logic, microcode, etc.), software, firmware, or a combination thereof. In one embodiment, the cloud-based AP classification and query system 100 of FIG. 1 performs the method 500. In another embodiment, the computing services 104 perform the method 500. In another embodiment, the classifying disconnects logic 122 of FIGS. 1-2A performs the method 500. In another embodiment, the cloud service 290 of FIG. 2C performs the method 500.

Referring to FIG. 5A, the method 500 begins by the processing logic receiving a data from one or more of a plurality of wireless devices (block 502). Each disconnect metric comprising at least i) a reason code associated with a disconnect message received by the wireless device from an access point (AP), and ii) a BSSID and an OUI associated with the AP. The processing logic identifies, using the data, a set of APs that are using a first reason code, the first reason code being associated with a load balancing or band steering operation (block 504). The processing logic receives a query from a wireless device with a first BSSID and a first OUI associated with a first AP (block 506). The processing logic determines that the first AP is part of the set of APs (block 508). The processing logic sends, to the wireless device, a response with the reason code used for the load balancing and band steering operation (block 510), and the method 500 ends.

Figure 5B:
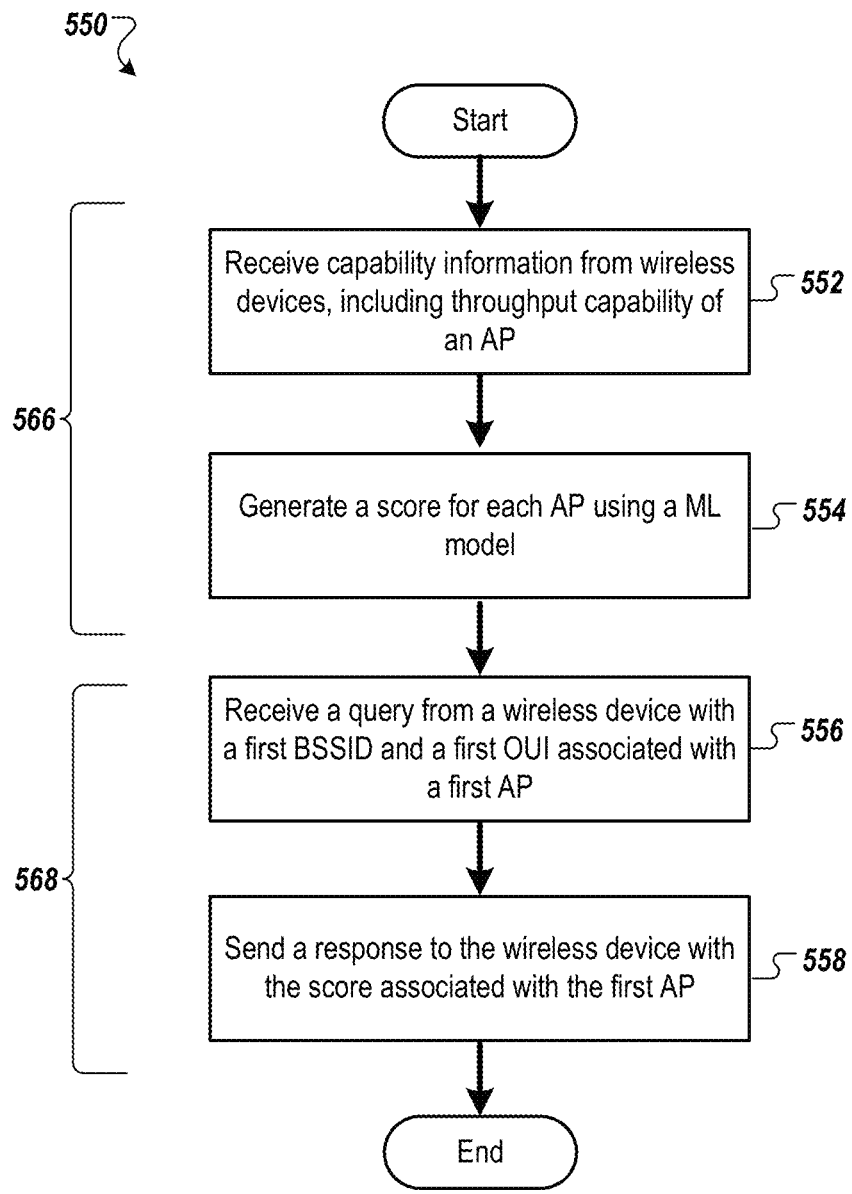
FIG. 5B is a flow diagram of a method of classifying scores representing AP performance, according to at least one embodiment.

FIG. 5B is a flow diagram of a method 550 of classifying scores representing AP performance, according to at least one embodiment. The method 550 may be performed by processing logic that comprises hardware (e.g., circuitry, dedicated logic, programmable logic, microcode, etc.), software, firmware, or a combination thereof. In one embodiment, the cloud-based AP classification and query system 100 of FIG. 1 performs the method 550. In another embodiment, the computing services 104 perform the method 550. In another embodiment, the classifying AP performance logic 120 of FIGS. 1-2A performs the method 550. In another embodiment, the cloud service 290 of FIG. 2C performs the method 550.

Referring to FIG. 5B, the method 550 begins by the processing logic receiving capability information of each of a plurality of APs (block 552). The capability information identifies at least a throughput capability of the respective AP. The processing logic generates, by a ML model and using the capability information, a score for each of the plurality of APs (block 554). The score represents a performance level of the respective AP. In at least one embodiment, an input feature set of the ML model includes at least the capability information. In another embodiment, the input feature set includes the capability information and the plurality of disconnect metrics. In at least one embodiment, the score is associated with a BSSID and an OUI of the respective AP. The processing logic receives a query from a wireless device of the plurality of wireless devices (block 556). The query includes a first BSSID and a first OUI associated with a first AP. The processing logic sends, to the wireless device, a response with the score associated with the first AP (block 558), and the method 550 ends.

In at least one embodiment, the capability information includes at least i) a portion of a first hex string of an HT capabilities element structure, ii) a portion of a second hex string of a VHT capabilities element structure, iii) a portion of a third hex string of an EHT capabilities element structure, iv) a portion of a fourth hex string of an EXT_CAP capabilities element structure, or v) a portion of a hex string of a vendor element.

In one embodiment, the processing logic, in response to receiving the query, performs a lookup operation in a database. The database includes multiple entries. Each entry, corresponding to each of the APs, includes i) a location identifier of the respective AP, ii) a value comprising at least a portion of each of the OUI and the BSSID of the respective AP, iii) a WLAN generation identifier, and iv) at least one of the score or the reason code associated with the respective AP.

In another embodiment, the processing logic receives vendor information at block 552. The vendor information identifies a vendor model of the respective AP that is broadcast in one or more beacon frames by the respective AP. In at least one embodiment, the vendor information includes at least a portion of a hex string of vendor elements in the one or more beacon frames. The processing logic generates the score for each of the APs using an ML model with an input feature set having at least the vendor information. The input feature set can also have the disconnect metrics. The score is associated with a BSSID and an OUI of the respective AP. The processing logic receives a query from a wireless device, the query including a BSSID and an OUI associated with a first AP. The processing logic sends a response with the score to the wireless device.

Figure 6A:
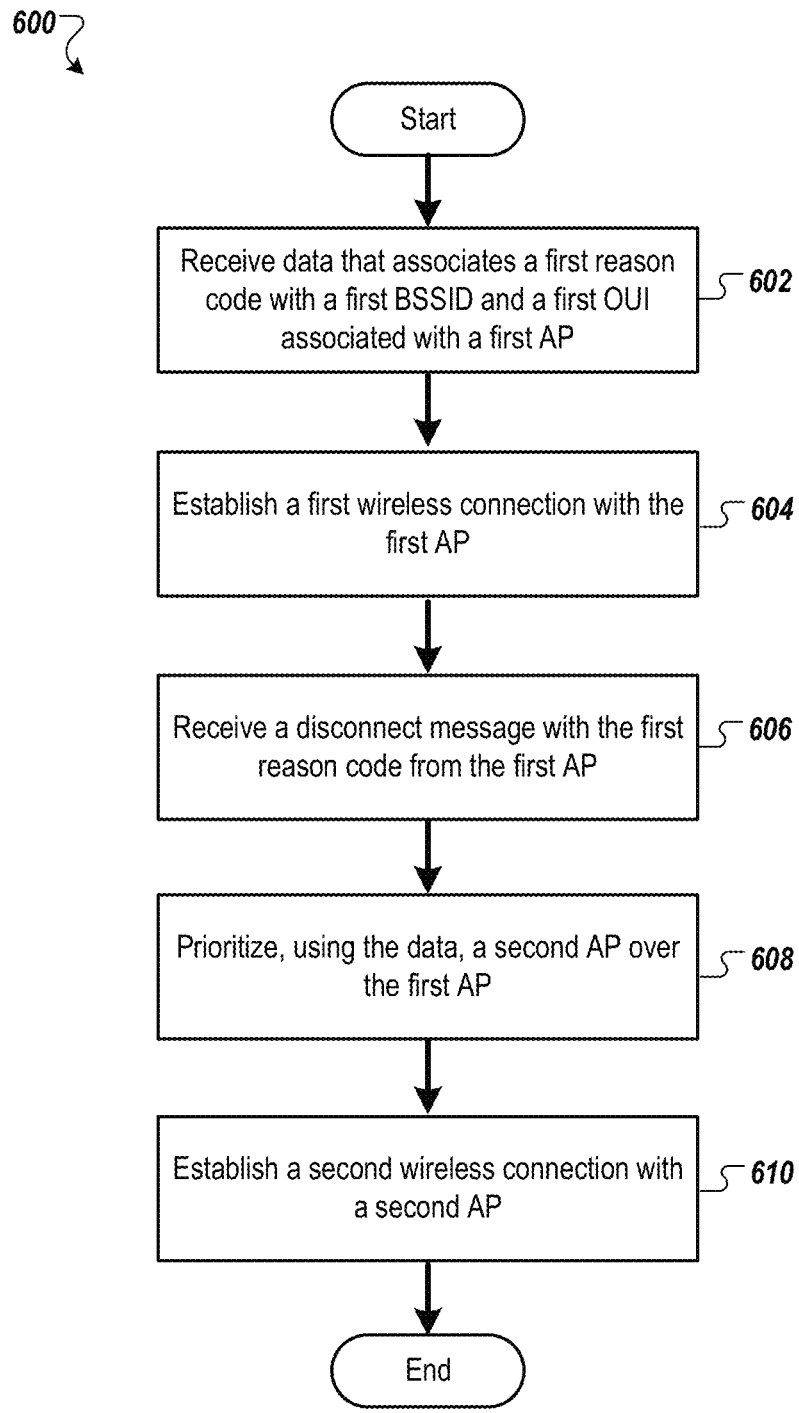
FIG. 6A is a flow diagram of a method of AP selection using classified reason codes used for load balancing or band steering operations, according to at least one embodiment.

FIG. 6A is a flow diagram of a method 600 of AP selection using classified reason codes used for load balancing or band steering operations, according to at least one embodiment. The method 600 may be performed by processing logic that comprises hardware (e.g., circuitry, dedicated logic, programmable logic, microcode, etc.), software, firmware, or a combination thereof. In one embodiment, any of the wireless devices 110 of FIGS. 1-2B performs the method 600. In another embodiment, the first wireless device 210 of FIG. 2A-2B performs the method 600. In another embodiment, the first wireless device 260 of FIG. 2C performs the method 600.

Referring to FIG. 6A, the method 600 begins by the processing logic receiving, from a cloud service, data that associates a first reason code with a first BSSID and a first OUI associated with a first AP (block 602). The first reason code is associated with a load balancing or band steering operation of the first AP. The processing logic establishes a first wireless connection with the first AP (block 604). Subsequently, the processing logic receives a disconnect message from the first AP (block 606). The disconnect message includes the first reason code. The processing logic prioritizes, using the data, a second AP over the first AP (block 608). The processing logic establishes a second wireless connection with a second AP (block 610), and the method 600 ends.

In at least one embodiment, the processing logic sends event data to the cloud service, the event data including the first OUI, the first BSSID, and the first reason code. In a further embodiment, the processing logic receives one or more beacon frames from a third AP and sends, to the cloud service, capability information of the third AP. The processing logic extracts the capability information from the one or more beacon frames. The capability information identifies at least a throughput capability of the third AP. In at least one embodiment, the capability information comprises at least i) a portion of a first hex string of capability elements in an HT capabilities element structure of the one or more beacon frames, ii) a portion of a second hex string of capability elements in a VHT capabilities element structure of the one or more beacon frames, iii) a portion of a third hex string of capability elements in an EHT capabilities element structure of the one or more beacon frames, or iv) a portion of a fourth hex string of capabilities elements in an EXT_CAP capabilities element structure of the one or more beacon frames. In at least one embodiment, the processing logic receives one or more beacon frames from a third AP. The processing logic extracts vendor information from the one or more beacon frames. The processing logic sends, to the cloud service, vendor information of the third AP. The vendor information identifies a vendor model of the AP. In at least one embodiment, the vendor information includes at least a portion of a hex string of vendor elements in the one or more beacon frames.

Figure 6B:
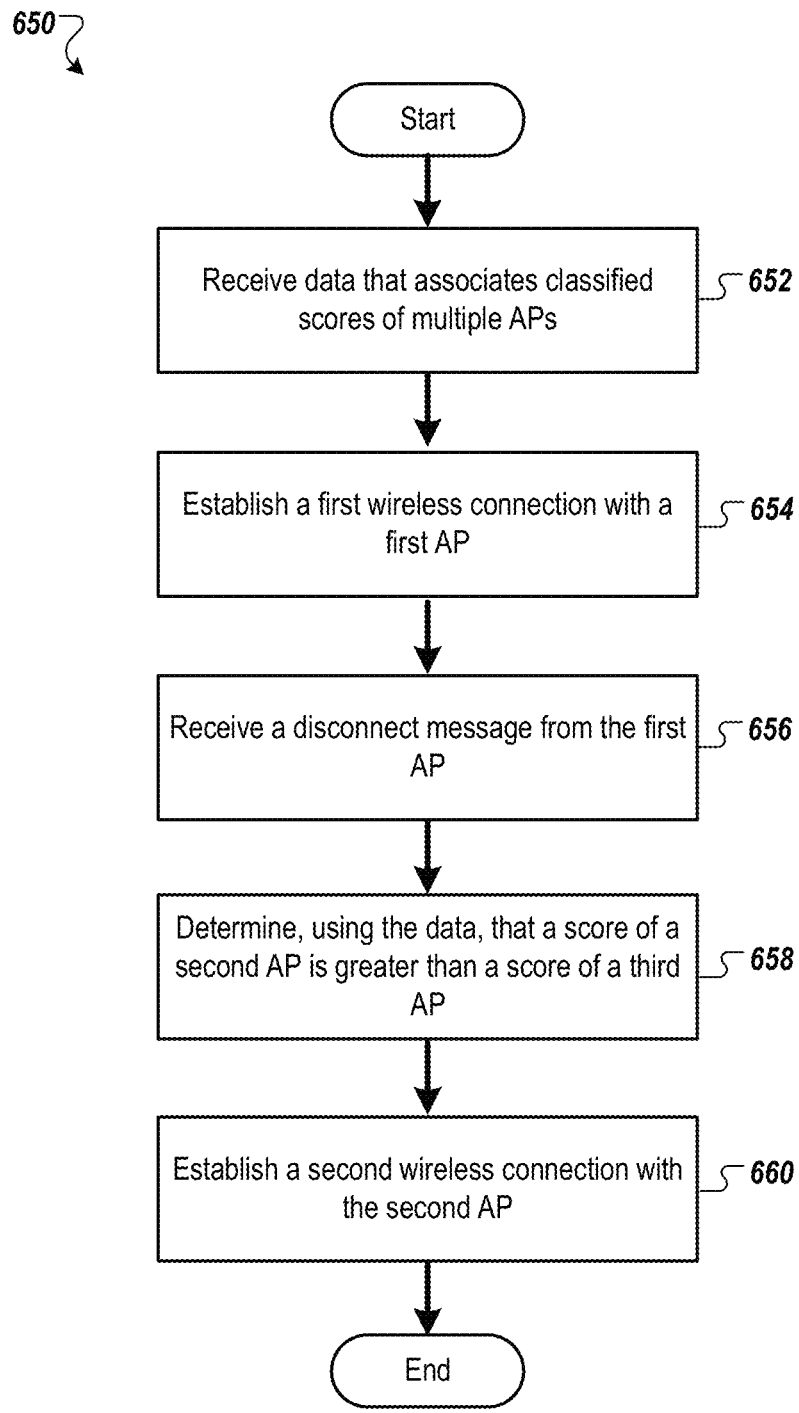
FIG. 6B is a flow diagram of a method of AP selection using classified AP performance scores, according to at least one embodiment.

FIG. 6B is a flow diagram of a method 650 of AP selection using classified AP performance scores, according to at least one embodiment. The method 650 may be performed by processing logic that comprises hardware (e.g., circuitry, dedicated logic, programmable logic, microcode, etc.), software, firmware, or a combination thereof. In one embodiment, any of the wireless devices 110 of FIGS. 1-2B performs the method 650. In another embodiment, the first wireless device 210 of FIG. 2A-2B performs the method 650. In another embodiment, the first wireless device 260 of FIG. 2C performs the method 650.

Referring to FIG. 6B, the method 650 begins by the processing logic receiving, from a cloud service, data that associates classified scores of multiple APs (block 652). The processing logic establishes a first wireless connection with the first AP (block 654). Subsequently, the processing logic receives a disconnect message from the first AP (block 656). The processing logic determines, using the data, that a score of a second AP is greater than a score of a third AP (block 658), where a lower score indicates a lower performance level. The processing logic establishes a second wireless connection with the second AP (block 660), and the method 650 ends.

In another embodiment, the processing logic sends, to the cloud service, a query with a second BSSID and a second OUI associated with the second AP. The processing logic receives, from the cloud service, a response with the second score, the second score represents a performance level of the second AP. The processing logic can send, to the cloud service, a query to retrieve the third score, the third score representing a performance level of the third AP.

Figure 7:
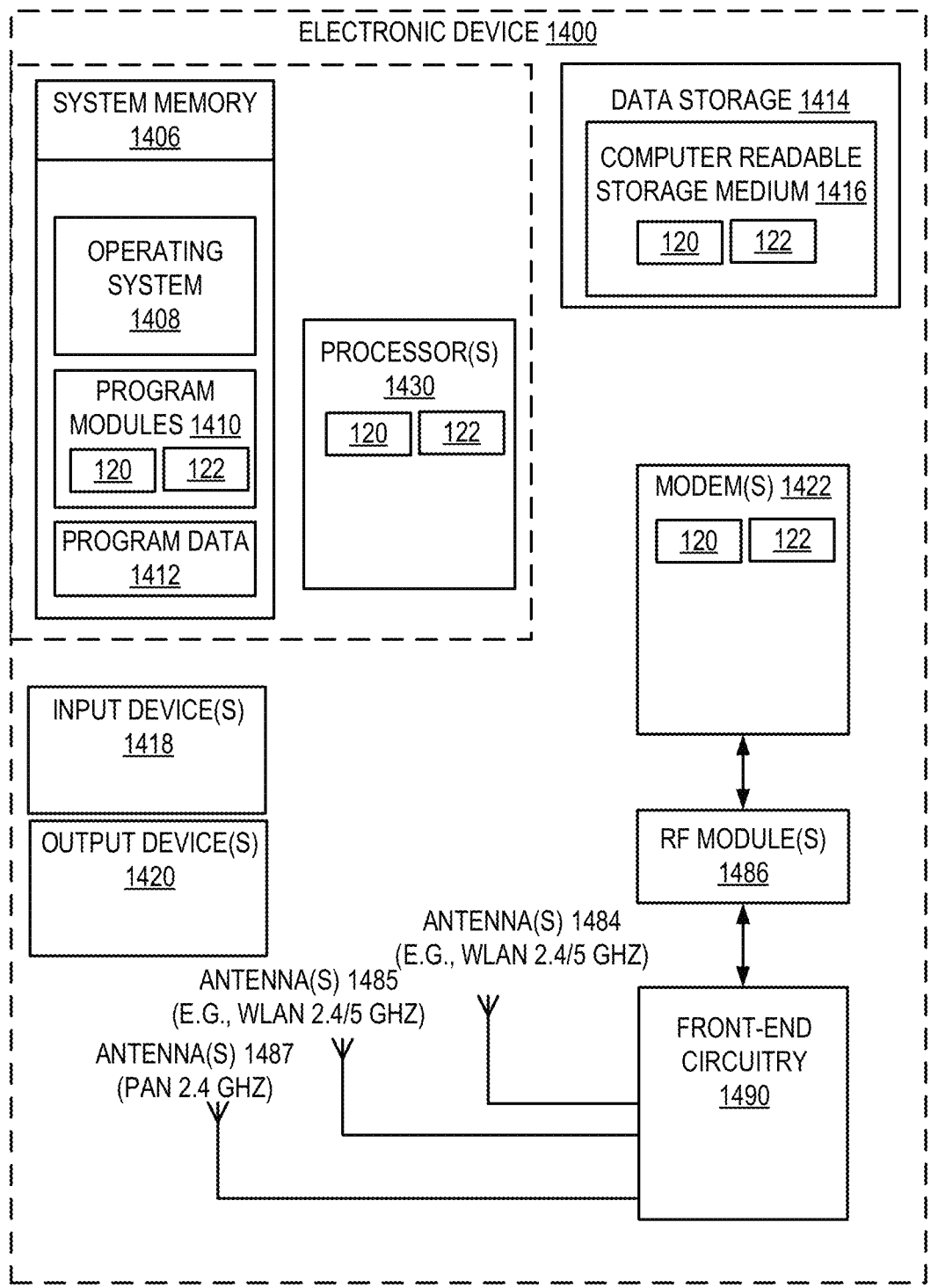
FIG. 7 is a block diagram of a network hardware device with a cloud-based AP classification and query system according to one embodiment.

FIG. 7 is a block diagram of a network hardware device 700 with a cloud-based AP classification and query system 100 according to one embodiment. The network hardware device 700 may correspond to any of the nodes or devices described above with respect to FIGS. 1-6. Alternatively, the network hardware device 700 may be other electronic devices, as described herein.

The network hardware device 700 includes one or more processor(s) 730, such as one or more CPUs, microcontrollers, field-programmable gate arrays, or other types of processing devices. The network hardware device 700 also includes system memory 706, which may correspond to any combination of volatile and/or non-volatile storage mechanisms (e.g., one or more memory devices). The system memory 706 stores information that provides operating system component 708, various program modules 710, program data 712, and/or other components. In one embodiment, the system memory 706 stores instructions of methods to control the operation of the network hardware device 700. The network hardware device 700 performs functions by using the processor(s) 730 to execute instructions provided by the system memory 706. In one embodiment, the program modules 710 may include the logic 120, 122 of the cloud-based AP classification and query system 100 described.

In at least one embodiment, a processing device is operatively coupled to a memory device that stores instructions. The processing device executes instructions to perform various operations, including: storing first data associated with wireless devices that are part of a wireless network having a three-tier topology, the first data comprising a plurality of node identifiers that each identify a wireless device in the wireless network, a tier type associated with each of the plurality of node identifiers, a number of children nodes connected to the respective device associated with each of the plurality of node identifiers, and physical proximity information associated with each the plurality of node identifiers; grouping a first set of node identifiers using the physical proximity information associated with wireless devices located in a first area; generating, from the first set of node identifiers, a first list of node identifiers associated with a first-tier type, wherein the first list is prioritized according to the number of children nodes; generating, from the first set of node identifiers, a second list of node identifiers associated with a second-tier type, wherein the second list is prioritized according to the number of children nodes; generating, from the first set of node identifiers, a third list of node identifiers associated with a third-tier type, wherein the third list is prioritized according to the number of children nodes; assigning, from a list of available channels, an available channel to each node identifier in the first list using a cost function that applies a set of penalties for a specific channel bandwidth; assigning, from the list of available channels, an available channel to each node identifier in the second list using the cost function after assigning the available channel to each node identifier in the first list; assigning, from the list of available channels, an available to each node identifier in the third list using the cost function after assigning the available channel to each node identifier in the second list; and sending, to the wireless devices located in the first area, second data that identifies assigned channels. In a further embodiment, the operations further include: sending, to the wireless device corresponding to the node identifiers in the first list, a first portion of the second data that identifies the assigned channels; sending, to the wireless device corresponding to the node identifiers in the second list, a second portion of the second data that identifies the assigned channels after sending the first portion; and sending, to the wireless device corresponding to the node identifiers in the third list, a third portion of the second data that identifies the assigned channels after sending the second portion.

The network hardware device 700 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 (e.g., 120, 122) may reside, completely or at least partially, within the computer-readable storage medium 716, system memory 706, and/or within the processor(s) 730 during execution thereof by the network hardware device 700, the system memory 706 and the processor(s) 730 also constituting computer-readable media. The network hardware device 700 may also include one or more input devices 718 (keyboard, mouse device, specialized selection keys, etc.) and one or more output devices 720 (displays, printers, audio output mechanisms, etc.).

The network hardware device 700 further includes a modem 722 to allow the network hardware device 700 to communicate via wireless connections (e.g., such as provided by the wireless communication system) with other computing devices, such as remote computers, an item providing system, and so forth. The modem 722 can be connected to one or more RF modules 786. The RF modules 786 may be a WLAN module, a WAN module, a PAN module, a GPS module, or the like. The antenna structures (antenna(s) 784, 785, 787) are coupled to the RF circuitry 783, which is coupled to the modem 722. The RF circuitry 783 may include radio front-end circuitry, antenna-switching circuitry, impedance matching circuitry, or the like. The antennas 784 may be GPS antennas, NFC antennas, other WAN antennas, WLAN or PAN antennas, or the like. The modem 722 allows the network hardware device 700 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 722 may generate signals and send these signals to the antenna(s) 784 of a first type (e.g., WLAN 5 GHz), antenna(s) 785 of a second type (e.g., WLAN 2.4 GHz), and/or antenna(s) 787 of a third type (e.g., WAN), via RF circuitry 783, and RF module(s) 786 as described herein. Antennas 784, 785, 787 may be configured to transmit in different frequency bands and/or using different wireless communication protocols. The antennas 784, 785, 787 may be directional, omnidirectional, or non-directional antennas. In addition to sending data, antennas 784, 785, 787 may also receive data, which is sent to appropriate RF modules connected to the antennas. One of the antennas 784, 785, 787 may be any combination of the antenna structures described herein.

In one embodiment, the network hardware device 700 establishes a first connection using a first wireless communication protocol, and a second connection using a different wireless communication protocol. The first wireless connection and second wireless connection may be active concurrently, for example, if a network hardware device receives a media item from another network hardware device via the first connection and transfers a file to another user device via the second connection at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network (WMN), and the second wireless connection may be associated with serving a content file to a client consumption device, as described herein.

Though a modem 722 is shown to control transmission and reception via the antenna (784, 785, 787), the network hardware device 700 may alternatively include multiple modems, each of which is configured to transmit/receive data via a different antenna and/or wireless transmission protocol.

In other embodiment, one or more hardware network devices can be mesh network devices in a WMN. A WMN can contain multiple mesh network devices, organized in a mesh topology. The mesh network devices in the WMN cooperate in the distribution of content files to client consumption devices in an environment, such as in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of the POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical, or access patterns are predictable. The embodiments described herein are compatible with existing content delivery technologies and may leverage architectural solutions, such as CDN services like the Amazon AWS CloudFront service. Amazon CloudFront CDN is a global CDN service that integrates with other Amazon Web services products to distribute content to end-users with low latency and high data transfer speeds. The embodiments described herein can be an extension to this global CDN, but in environments where there is limited broadband Internet infrastructure. The embodiments described herein may provide users in these environments with a content delivery experience that is equivalent to what the users would receive on a traditional broadband Internet connection. The embodiments described herein may be used to optimize deployment for traffic types (e.g., streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing device comprising:
   a memory device that stores instructions; and
   a processing device, operatively coupled to the memory device, executes the instructions to perform operations comprising:
   receiving data from a plurality of wireless devices, the data comprising, for each wireless device of the plurality of wireless devices, at least i) a reason code associated with a disconnect message received by the wireless device from an access point (AP), and ii) a basic service set identifier (BSSID) and an Organizationally Unique Identifier (OUI) associated with the AP;
   identifying, using the data, a set of APs that are using a first reason code, wherein the first reason code is associated with load balancing or band steering operation;
   receiving a query from a first wireless device of the plurality of wireless devices, the query comprising a first BSSID and a first OUI associated with a first AP;
   determining that the first AP is part of the set of APs; and
   sending a response to the first wireless device, the response comprising the first reason code.

2. The computing device of claim 1, wherein the operations further comprise:
   receiving, from the plurality of wireless devices, capability information of each of a plurality of APs, wherein the capability information identifies at least a throughput capability of the respective AP;
   generating, by a machine learning (ML) model and using the capability information and the data, a score for each of the plurality of APs representing a performance level of the respective AP;
   receiving a second query from a second wireless device of the plurality of wireless devices, the second query comprising a second BSSID and a second OUI associated with a second AP; and
   sending a second response to the second wireless device, the second response comprising the score associated with the second AP.

3. The computing device of claim 2, wherein the capability information comprises one or more of: i) a portion of a first hex string of a High Throughput (HT) capabilities element structure, ii) a portion of a second hex string of a Very High Throughput (VHT) capabilities element structure, iii) a portion of a third hex string of an Extremely High Throughput (EHT) capabilities element structure, iv) a portion of a fourth hex string of an Extended Capabilities (EXT_CAP) capabilities element structure, or v) a portion of a hex string of a vendor element.

4. The computing device of claim 2, wherein the operations further comprise performing a lookup operation in a database, in response to receiving the query, wherein the database comprises a plurality of entries for each of the plurality of APs, each entry comprising i) a location identifier of the respective AP, ii) a value comprising at least a portion of each of the OUI and the BSSID of the respective AP, iii) a wireless local area network (WLAN) generation identifier, and iv) at least one of the score or the reason code associated with the respective AP.

5. The computing device of claim 1, wherein the operations further comprise:
   receiving, from the plurality of wireless devices, at least one of vendor information, a High Throughput (HT) capability information, Very High Throughput (VHT) capability information, Extended Capabilities (EXT_CAP) information, or Extremely High Throughput (EHT) capability information of each of a plurality of APs;
   generating a signature for each of the plurality of APs using the at least one of the vendor information, the HT capability information, the VHT capability information, the EXT_CAP information, or the EHT capability information;
   generating, by a machine learning (ML) model and using the signature and the data, a score for each of the plurality of APs representing a performance level of the respective AP;
   receiving a second query from a second wireless device of the plurality of wireless devices, the second query comprising a second BSSID and a second OUI associated with a second AP; and
   sending a second response to the second wireless device, the second response comprising the score associated with the second AP.

6. The computing device of claim 5, wherein the vendor information comprises at least a portion of a hex string of vendor elements.

7. A wireless device comprising:
   one or more wireless local area network (WLAN) radios;
   a memory device that stores instructions; and
   a processing device, operatively coupled to the memory device and the one or more WLAN radios, that executes the instructions to perform operations comprising:

receiving, from a server device, data that associates a first reason code with a first basic service set identifier (BSSID) and a first Organizationally Unique Identifier (OUI) associated with a first access point (AP), wherein the first reason code is associated with a load balancing or band steering operation of the first AP;
establishing a first connection with the first AP;
receiving a disconnect message from the first AP, the disconnect message comprising the first reason code; and
subsequently establishing, based on the data, a second connection with a second AP.

8. The wireless device of claim 7, wherein the operations further comprise sending event data to the server device, the event data comprising the first OUI, the first BSSID, and the first reason code.

9. The wireless device of claim 7, wherein the operations further comprise:
receiving one or more beacon frames from a third AP;
extracting capability information of the third AP from the one or more beacon frames; and
sending, to the server device, the capability information of the third AP, wherein the capability information identifies at least a throughput capability of the third AP.

10. The wireless device of claim 9, wherein the capability information comprises at least i) a portion of a first hex string of a High Throughput (HT) capabilities element structure of the one or more beacon frames, ii) a portion of a second hex string of a Very High Throughput (VHT) capabilities element structure of the one or more beacon frames, iii) a portion of a third hex string of an Extremely High Throughput (EHT) capabilities element structure of the one or more beacon frames, iv) a portion of a fourth hex string of an Extended Capabilities (EXT_CAP) capabilities element structure of the one or more beacon frames, or v) a portion of a fifth hex string of a vendor element of the one or more beacon frames.

11. The wireless device of claim 7, wherein the operations further comprise:
receiving one or more beacon frames from a third AP;
extracting vendor information of the third AP from the one or more beacon frames; and
sending, to the server device, the vendor information of the third AP, wherein the vendor information identifies a vendor model of the AP.

12. The wireless device of claim 11, wherein the vendor information comprises at least a portion of a hex string of vendor elements in the one or more beacon frames.

13. The wireless device of claim 7, wherein the operations further comprise:
sending a query to the server device, the query comprising a second BSSID and a second OUI associated with the second AP;
receiving a response from the server device, the response comprising a score associated with the second AP, wherein the score represents a performance level of the second AP; and
establishing a third connection with a third AP based on the score of the second AP being lower than a score of the third AP.

14. The wireless device of claim 7, wherein the data includes information that associates the first OUI and the first BSSID with the first reason code and associates the first OUI and a third BSSID with a second reason code.

15. The wireless device of claim 7, wherein the data includes information that associates the first OUI and the first BSSID with the first reason code and a first score that represents a performance level of the first AP, wherein the data associates a second OUI and a second BSSID with a second score that represents a performance level of the second AP, wherein the data associates a third OUI and a third BSSID with a third score that represents a performance level of a third AP, and wherein the operations further comprise determining that the second score is greater than the third score before establishing the second connection with the second AP.

16. A method comprising:
receiving metrics data from each of a plurality of wireless devices, the metrics data comprising i) a reason code associated with a disconnect message received by the wireless device from an access point (AP), and ii) a basic service set identifier (BSSID) and an Organizationally Unique Identifier (OUI) associated with the AP;
identifying, using the metrics data, a set of APs that use a first reason code, wherein the first reason code is associated with a load balancing or band steering operation;
receiving a query from a first wireless device of the plurality of wireless devices, the query comprising a first BSSID and a first OUI associated with a first AP;
determining that the first AP is part of the set of APs; and
sending a response to the first wireless device, the response comprising the first reason code.

17. The method of claim 16, further comprising:
receiving, from the plurality of wireless devices, capability information of each of a plurality of APs, wherein the capability information identifies at least a throughput capability of the respective AP;
generating, by a machine learning (ML) model and using the capability information and the metrics data, a score for each of the plurality of APs representing a performance level of the respective AP;
receiving a second query from a second wireless device of the plurality of wireless devices, the second query comprising a second BSSID and a second OUI associated with a second AP; and
sending a second response to the second wireless device, the second response comprising the score associated with the second AP.

18. The method of claim 17, wherein the capability information comprises one or more of: i) a portion of a first hex string of a High Throughput (HT) capabilities element structure, ii) a portion of a second hex string of a Very High Throughput (VHT) capabilities element structure, iii) a portion of a third hex string of an Extremely High Throughput (EHT) capabilities element structure, iv) a portion of a fourth hex string of an Extended Capabilities (EXT_CAP) capabilities element structure, or v) a portion of a fifth hex string of a vendor element.

19. The method of claim 16, further comprising:
receiving, from the plurality of wireless devices, one of: vendor information, a High Throughput (HT) capability information, Very High Throughput (VHT) capability information, Extended Capabilities (EXT_CAP) information, or Extremely High Throughput (EHT) capability information of each of a plurality of APs;
generating a signature for each of the plurality of APs using one of: the vendor information, the HT capability information, the VHT capability information, the EXT_CAP information, or the EHT capability information;

generating, by a machine learning (ML) model and using the signature and the metrics data, a score for each of the plurality of APs representing a performance level of the respective AP;

receiving a second query from a second wireless device of the plurality of wireless devices, the second query comprising a second BSSID and a second OUI associated with a second AP; and sending a second response to the second wireless device, the second response comprising the score associated with the second AP.

20. The method of claim 19, wherein the vendor information comprises at least a portion of a hex string of a vendor element.

\* \* \* \* \*